Figure 4:
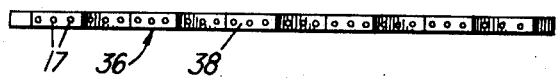

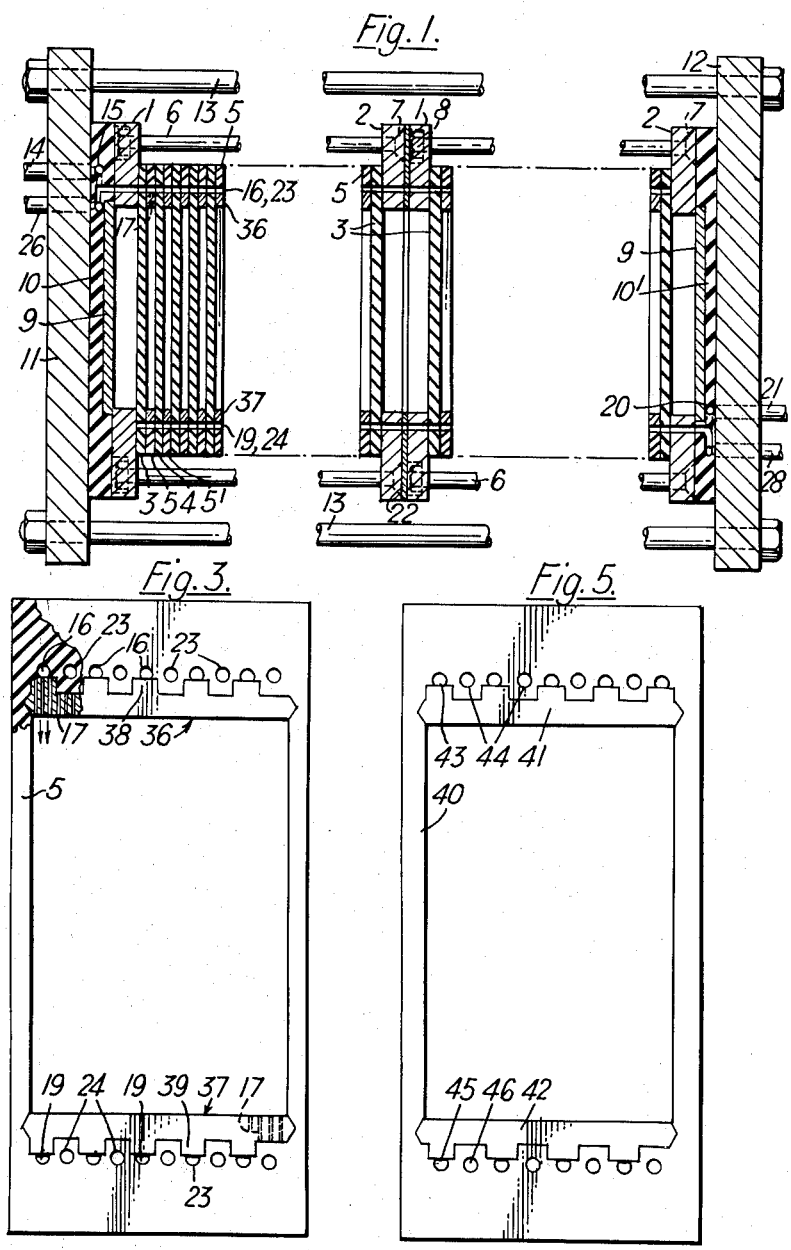

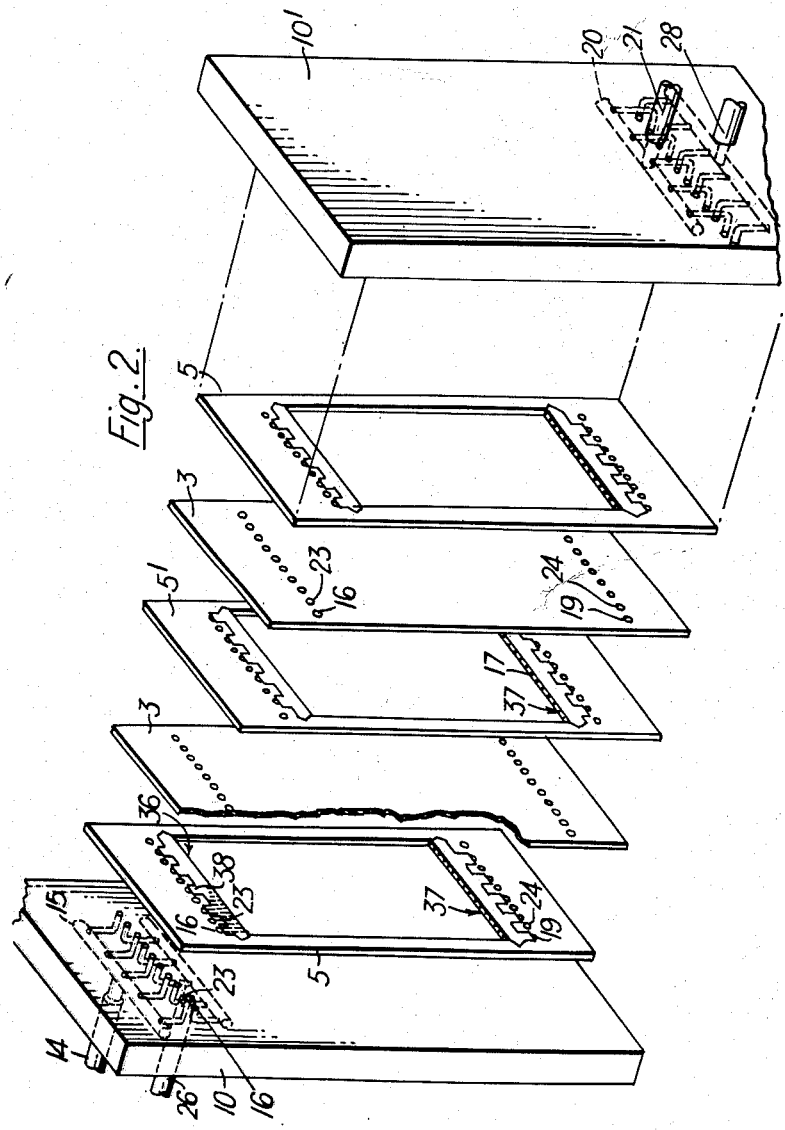

April 16, 1963 J. B. DAVIS 3,085,970
ELECTRODIALYSIS CELLS AND INSERTS THEREFOR
Filed Aug. 22, 1960 3 Sheets-Sheet 3

Inventor
John Bromley Davis
By
Bailey, Stephens & Huettig
Attorneys

United States Patent Office 3,085,970
Patented Apr. 16, 1963

3,085,970
ELECTRODIALYSIS CELLS AND INSERTS THEREFOR
John Bromley Davis, Didsbury, Manchester, England, assignor to The Permutit Company Limited
Filed Aug. 22, 1960, Ser. No. 50,913
Claims priority, application Great Britain Aug. 21, 1959
7 Claims. (Cl. 204—301)

This invention relates to that kind of dialysis or electrodialysis cell which comprises a series of narrow compartments that are arranged between end plates or electrodes, are bounded on their major faces by ion-permeable or ion-selective membranes and lie within the open centres of spacers interposed between adjacent membranes. In such cells the introduction of liquid into and removal of it from each compartment is a matter of difficulty as the distance between adjacent membranes is preferably small and the spacers are therefore very thin. Most conveniently conduits are formed through the cell by cooperating holes in the membranes and spacers, and the spacers are slotted to connect the holes to the appropriate compartments. Now most membranes are flexible and there is a tendency for the parts of these membranes that register with a slot to bend and bow into it under the pressure applied to compress the membranes and spacers and make the cell liquid-tight. This difficulty can be overcome by making each hole communicate with the compartment through an insert which is put into the slot and substantially fills it.

Commonly two liquids flow through the cell in alternate compartments. The number and shape of the conduits for each liquid may vary considerably. There are advantages in making each of substantial size so that all the liquid is supplied from a single conduit and discharged into another, and in flowing from the supply conduit to the discharge is divided into a number of parallel streams each of which passes through one compartment. In an electrodialysis cell the disadvantage then arises that the liquid in each of these conduits can constitute a considerable leakage path for the electric current. This disadvantage is reduced if, instead of making the supply and discharge conduits extend continuously from one end of the cell to the other, so that the liquid flows through only one compartment in its passage through the cell, the compartments between two electrodes are divided into groups between which the flow of a liquid takes place in series but in each of which it is in parallel streams through the compartments receiving the liquid in question. This arrangement is often called series-parallel. All-parallel flow, i.e. the division of the liquid into as many streams as there are compartments to receive it, has advantages, but to reduce the current leakage the conduits should be of small cross-sectional area. Therefore the main stream of liquid supplied to a number of compartments to flow in parallel streams through them may be divided into separate streams flowing in parallel small conduits from each of which liquid flows to each of the compartments in question, the liquid from each compartment being discharged into a similar (but not necessarily identical) number of conduits.

Commonly the open centres of the spacers are rectangular, so that each compartment has two pairs of opposite parallel edges. The open centres may, however, be of other shapes, e.g. elliptical, but in practice, the centre always presents two pairs of opposite lengths (straight or curved) which may be regarded as and will be called "opposite edges" in this specification.

Now the production of large membranes involves various difficulties such that it is normally easier and more economical to manufacture an elongated membrane of the desired total area than an equivalent square membrane. The elongated shape is further advantageous in that the desired uniform flow of liquid through the compartment can more easily be obtained by introducing the liquid along one of the two short edges than over a longer edge. Since two liquids have to be introduced into and discharged from alternate compartments two sets of conduits are needed and the area in each spacer necessary for these can best be provided behind the narrow inner edges of the spacers. Moreover the amount of membrane area wasted because it is covered by the spacers is less when the membranes and spacers are elongated. When, however, conduit-forming holes for both liquids are made behind one edge of a spacer, the problem of connecting them to the open centres of the spacers gives rise to difficulty.

It is one object of this invention to provide improved means for connecting conduit-forming holes to the open centres of spacers.

It is another object to provide novel and useful members for use as flow-permitting inserts in cells of the kind in question.

In a cell constructed according to this invention, two sets of holes are made behind each of the two opposite edges of the centre of each spacer, both these edges are so castellated as to expose the holes in one set but not the other, and these holes communicate with the compartment within the spacer by an insert that is castellated in complementary fashion, is resistant to deformation and formed with passages through which the liquid flows between the hole and the compartment in a number of small streams. Thus the main liquid stream entering the cell is split up into sub-streams each flowing in one of the parallel conduits, and each of these is in turn split up into smaller streams in entering the compartment, the reverse taking place on discharge. As a result the advantages of parallel flow, uniform distribution of the liquid throughout each compartment, prevention of the restriction of flow that results from bowing or flexing of a membrane, good use of membrane area and (in an electrodialysis cell) small leakage loss, are all obtained.

The invention also comprises novel inserts. Broadly these are made of a plastic that is resistant to deformation and have two parallel elongated major faces with tunnel-like apertures extending from between the major faces transverse to the longer dimension thereof from one edge to the other.

Figure 6:
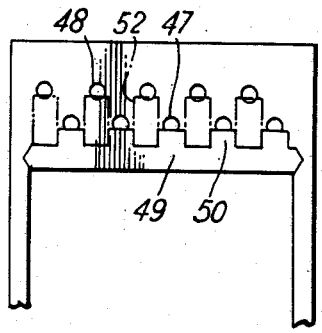
Figure 7:
Figure 8:
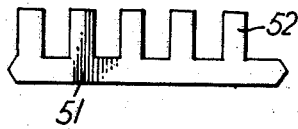

The accompanying drawings show one cell and various spacers and inserts. In them:

FIGURE 1 is a diagram of the cell;
FIGURE 2 is an exploded view of parts of the cell;
FIGURE 3 is an enlarged view of one spacer of the cell with an insert in position;
FIGURE 4 is an edge view of this insert;
FIGURES 5 and 6 shows two different spacers with inserts; and
FIGURES 7 and 8 show two inserts used in the spacer shown in FIGURE 6.

The cell shown in FIGURES 1 and 2 comprises units each composed of two rigid spacers 1 and 2, one at each end, anion-selective membranes 3 alternating with cation-selective membranes 4, and flexible spacers 5 and 5' alternately separating adjacent membranes. The spacers 5 and 5' are rectangular frames and the central space within each bounded in the longitudinal direction by two adjacent membranes forms a compartment.

The members forming each unit are united by bolts 6 having heads 7 countersunk into the rigid spacer 2 of the unit and nuts 8 fitting in cavities in the rigid spacer 1 of the unit. The spacers 1 and 2 extend outwards beyond the membranes and flexible spacers to receive the bolts 6.

The units with gaskets 22 between them are assembled end to end between electrodes 9 constituted by metal or carbon plates let into insulating supports 10 and 10'. The whole assembly thus formed is clamped between plates 11 and 12 which extend outwards beyond the rigid spacers to receive bolts 13 which are tightened up to apply the endwise clamping pressure.

The unit construction made possible by the provision of the rigid spacers 1 and 2 is not essential to the invention, though it is very convenient in practice.

It will be observed that each membrane and spacer is elongated and that (as seen in FIGURES 2 and 3) there is available area for conduit-forming holes behind the top and bottom edges around the central space but very little available area behind the side edges.

In use an electrolyte is supplied to every alternate compartment through a pipe 14 which discharges into a recess 15 in the plate 10. This recess communicates with the ends of a set of parallel conduits each formed by registering holes 16 in the plate 10 and in all the membranes and spacers, the holes in the spacers lying in a row behind one edge of the spacer and intersecting its edge, i.e. being exposed there, so that they are in effect slots. A similar row of holes 19 behind the opposite edges of the spacers 5 with cooperating holes in the membranes forms a second set of parallel conduits for the discharge of the electrolyte, these conduits communicating with a slot 20 that is made in the plate 10' and leads to a discharge pipe 21.

Behind the first edge of the spacer 5 there is a second set of holes 23 which are in the same row as the holes 16 but which do not break into the edge of the spacer 5, since this is castellated as shown particularly in FIGURE 3. Behind the second edge there is also a second set of holes 24 in the same row as and alternating with the holes 19, but separated from the edge by material of the spacer.

The conduit-forming holes 16 serve for the flow of one electrolyte and the similar holes 23 for the discharge of the same electrolyte. The conduit-forming holes 19 serve for the supply and the holes 24 for the discharge of the second electrolyte. To admit the first electrolyte to and discharge it from the compartment within the spacer inserts 36 and 37 are provided. Each insert is formed of a plastic, is rectangular in cross-section and is elongated with two parallel major faces. Its thickness is the same as that of each spacer 5. Tunnel-like holes 17 extend through it between and parallel to the major faces and transverse to the larger dimension thereof. Each hole 17 is much smaller in cross-section than the holes forming the conduits. In FIGURES 3 and 4, the holes in an insert are indicated at 17. On the scale of FIGURE 4 their cross-sectional shape cannot be seen. They may be circular or triangular in cross-section. Each hole 16, 19, 23 or 24 forming part of a conduit registers with several holes 17, so the electrolyte flowing through each conduit is split up into smaller streams and is uniformly distributed over the whole breadth of the compartment.

In FIGURES 2 and 3 only five conduit-forming holes in each set are shown. In a spacer two feet wide there may be twelve or more conduit-forming holes in each set.

The second electrolyte flows through the remaining compartments, which are formed within the spacers 5'. This electrolyte enters through a pipe 26 and a slot in the plate which communicates with the set of parallel conduits formed by the holes 19, and leaves similarly at the other end through a pipe 28.

The insert 36 has castellations 38 which register with the holes 16 but not with the holes 19. Likewise the insert 37 has castellations 39 which register with the holes 23 but not with the holes 24. The inserts 36 and 37 are asymmetrical at their ends so that by reversing alternate inserts (turning one through 180° relative to the next) the castellations 38 are brought into register with the set of holes 16 in one spacer 5 and with the set of holes 29 in the next spacer 5'. As shown in FIGURE 3, the asymmetry may easily be produced by making the distance between one end of the insert and the first castellation greater than the equivalent distance at the other end.

FIGURE 5 shows a spacer 40 with two inserts 41 and 42 which differ in the number of castellations, the insert 41 having five and the insert 42 only four. The spacer has a set of five conduit-forming holes 43 for the supply of one electrolyte and a similar set 44 for the supply of the other. There are, however, only four conduit-forming holes 45 for the discharge of the first electrolyte and similar holes 46 for the discharge of the second. Flow takes place from the holes 43 to the holes 45 through the open centre of the spacer. It will readily be seen that if in the next spacer an insert 42 is put at the supply side and an insert 41 at the discharge side the second electrolyte will flow through the open centre.

When the two sets of holes are arranged in different rows, the castellations on both spacers and inserts are of different height in accordance with the row of holes that is to be put in communication with the compartment in question. FIGURE 6 shows part of one such spacer with one set of holes 47 and another 48. FIGURE 7 shows an insert 49 with short castellations 50 to cooperate with the holes 47 and FIGURE 8 shows an insert 51 with longer castellations 52 to cooperate with the holes 48. In FIGURE 6 the insert 49 is shown in full lines and the castellations 52 of the insert 51 in the next compartment are shown in dotted lines. Of course the edges of both spacers are castellated in complementary fashion to the respective inserts.

The inserts shown extend over the whole width of each side of the compartment at which the liquid is introduced or removed. Such an insert can be fabricated by joining a number of rectangular pieces of perforated insert material to form a rectangular castellated or parallel-sided composite insert stretching across the whole side of the compartment. These pieces can be moulded from a thermoplastic, and a long insert can be formed from shorter moulded pieces, say four or five such pieces.

An insert may also be made from a rigid-setting plastic, e.g. an epoxy resin. If it is manufactured by casting such a thermo-setting resin, it may be stamped out from a sheet of this material such that it extends over the whole side of the compartment and the castellations make contact with the holes forming conduits through the spacer. Naturally the stamping must be made in such a way that the holes through the insert material are perpendicular to the edge of the spacer.

In any castellated insert, however made, the connecting pieces between the castellations may also contain holes, but these holes do not make contact with conduit-forming holes in the spacer with the result that flow into or out of the compartment takes place only through the castellated portions.

As an illustration of dimensions, the thickness of each spacer and therefore the width of each compartment between the adjacent membranes may be 50 thousandths of an inch, each conduit-forming hole may be circular and, say, ¼ inch in diameter, and the insert may contain numerous passages each 20 thousandths of an inch in diameter. These passages may exist over the whole length of the insert, although use is made of them only in those parts of the insert which form or represent continuations of the castellations.

In the drawings all-parallel flow is shown but the invention is useful also in cells arranged for series-parallel flow.

I claim:

1. In a cell for use in dialysis comprising a series of narrow compartments that are arranged between end members, are bounded on their major faces by ion-permeable membranes and lie within the open centres of spacers interposed between adjacent membranes, the spacers presenting two pairs of opposite edges and two sets of holes being made behind each of the opposite edges of one pair to form with cooperating holes in the membranes four sets of parallel conduits for the flow of one liquid through alternate compartments and of a second liquid through the remaining compartments, said spacers having notches therein extending from said opposite edges to the holes of one set only, and inserts each comprising a strip having castellations fitting in said notches, each insert being resistant to deformation, and being formed with passages for the flow of liquid between the holes of such one set and the compartment in a number of small streams.

2. A cell according to claim 1 in which the parallel conduits of each set are continuous throughout the cell, the liquid passing through each set thus being divided into sub-streams each flowing through only one compartment of the cell.

3. A cell according to claim 1 in which the compartments are divided into groups between which the flow of a liquid takes place in series but in each of which it is in parallel streams through the compartments receiving the liquid in question.

4. A cell according to claim 1 in which the inserts are asymmetrical at their ends so that by reversing alternate inserts the castellations on an insert are brought into register with one set of holes in one spacer and with the other set in the next spacer.

5. A cell according to claim 1 in which along each side of the spacer the sets of holes are arranged in two rows of holes that is to be put in communication with the compartment in question.

6. A cell according to claim 1 in which the open centres of the spacers are rectangular and each insert extends over the whole length of the edge of the spacer.

7. A cell according to claim 1 in which the inserts are rigid with tunnel-like openings forming the passages.

References Cited in the file of this patent

UNITED STATES PATENTS

| | | |
|---|---|---|
| 2,686,154 | MacNeill | Aug. 10, 1954 |
| 2,878,178 | Bier | Mar. 17, 1959 |
| 2,881,124 | Tye | Apr. 7, 1959 |
| 2,894,894 | Kressman | July 14, 1959 |
| 2,923,674 | Kressman | Feb. 2, 1960 |
| 2,951,027 | Partridge | Aug. 30, 1960 |

FOREIGN PATENTS

| | | |
|---|---|---|
| 837,460 | Great Britain | June 15, 1960 |